(12) United States Patent
Moision et al.

(10) Patent No.: US 8,920,218 B2
(45) Date of Patent: Dec. 30, 2014

(54) RESISTANCE SPOT WELD ELECTRODE DRESSER

(75) Inventors: William C. Moision, Northville, MI (US); Elizabeth T. Hetrick, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 299 days.

(21) Appl. No.: 13/546,043

(22) Filed: Jul. 11, 2012

(65) Prior Publication Data

US 2014/0013869 A1    Jan. 16, 2014

(51) Int. Cl.
*B23K 11/36* (2006.01)
*B23C 3/12* (2006.01)
*B23D 79/00* (2006.01)

(52) U.S. Cl.
USPC .......................................................... 451/443

(58) Field of Classification Search
CPC ...... B23C 3/12; B23C 2270/20; B23D 79/00; B23K 11/36; B23K 35/0205; B23K 35/0255; B23K 35/0288; B23K 35/222; B23K 35/302; B23K 35/40; B23K 35/402
USPC .......................................................... 451/443
See application file for complete search history.

(56) References Cited

U.S. PATENT DOCUMENTS

| | | | |
|---|---|---|---|
| 4,044,220 A | * | 8/1977 | Glagola .............. B23K 35/0205 |
| 4,954,687 A | * | 9/1990 | Bush et al. ........... B23K 35/402 |
| 4,966,504 A | | 10/1990 | Seme, Jr. et al. |
| 5,332,342 A | | 7/1994 | Kizaki et al. |
| 5,401,127 A | | 3/1995 | Nakajima et al. |
| 5,545,872 A | * | 8/1996 | Nakajima et al. ...... B23K 11/36 |
| 5,599,467 A | * | 2/1997 | Okabe et al. ................... 219/118 |
| 5,725,340 A | * | 3/1998 | Nakajima et al. .......... B23C 3/12 |
| 7,168,896 B2 | | 1/2007 | Koskinen et al. |

(Continued)

FOREIGN PATENT DOCUMENTS

| DE | 4217617 A | * | 12/1992 | ......... B23K 35/0205 |
|---|---|---|---|---|
| DE | 4323149 A1 | * | 1/1995 | ............. B23K 35/22 |

(Continued)

OTHER PUBLICATIONS

Rotech Tooling Sweden, www.rotech.se, last updated: Wednesday, Dec. 12, 2001, Copyright © 2000-2002, Rotech Tooling AB, 3 pages.

(Continued)

*Primary Examiner* — Thomas P Noland
(74) *Attorney, Agent, or Firm* — Raymond L. Coppiellie; MacMillan, Sobanski & Todd, LLC (57) ABSTRACT

An electrode dresser is provided. The electrode dresser includes a face cutting segment having a top surface and a face rake surface. The top surface intersects the face rake surface and forms a face cutting edge. The face cutting edge is configured to remove deposits located on a face of an electrode. The face rake surface forms a face rake angle with a line generally perpendicular to the top surface. A side cutting segment extends from the face cutting segment and has a top surface and a side cutting surface. The top surface intersects the side cutting surface thereby forming a side cutting edge. The side cutting edge is configured to dress a distorted tapered side of an electrode tip. The side cutting surface forms a side rake angle with a line perpendicular to the top surface. The face rake angle is different from the side rake angle.

18 Claims, 6 Drawing Sheets

(56) References Cited

U.S. PATENT DOCUMENTS

| | | | |
|---|---|---|---|
| 7,257,872 B2 | 8/2007 | Shim | |
| 7,291,799 B2 * | 11/2007 | Reed et al. | ............... 451/443 X |
| 7,789,600 B2 * | 9/2010 | Goto et al. | ............... B23C 3/12 |
| 2008/0075551 A1 * | 3/2008 | Nakazima | ................ B23C 3/12 |
| 2008/0078749 A1 * | 4/2008 | Sigler et al. | ........ B23K 35/0205 |
| 2008/0237199 A1 * | 10/2008 | Phillips | ................. B23K 11/36 |
| 2010/0044349 A1 * | 2/2010 | Yoo | ....................... B23K 11/36 |
| 2011/0266260 A1 * | 11/2011 | Sigler et al. | .......... B23K 35/302 |
| 2012/0067851 A1 * | 3/2012 | Lee | ...................... B23K 11/36 |

FOREIGN PATENT DOCUMENTS

| | | | | |
|---|---|---|---|---|
| EP | 806263 A1 * | 11/1997 | ............. | B23K 35/40 |
| EP | 1149654 A2 * | 10/2001 | ............. | B23K 11/11 |
| JP | 09150280 A * | 6/1997 | ................ | B23C 3/12 |
| JP | 11047953 A * | 2/1999 | ............. | B23K 11/30 |
| JP | 11179562 A * | 7/1999 | ................ | B23C 3/12 |
| JP | 2007216230 | 8/2007 | | |
| JP | 2010064090 | 3/2010 | | |

OTHER PUBLICATIONS

ABB Body-in-White AB, Electrode Dressers, Undated, but by Jul. 2012, 8 pages.

* cited by examiner

RESISTANCE SPOT WELD ELECTRODE DRESSER

BACKGROUND

Spot welding is a process in which contacting metal surfaces are joined by the heat obtained from resistance to electric current flow. Work-pieces are held together under pressure exerted by opposing electrodes. The spot welding process uses two shaped electrodes, formed from a copper alloy, to concentrate an electrical welding current into a small "spot" and to simultaneously clamp the metal surfaces together. Forcing a large electrical welding current through the spot will melt the metal and form the weld. Spot welding can deliver a lot of electrical welding current to the spot in very short time periods (approximately 250 milliseconds). The short timeframe permits the welding to occur without excessive heating to the remaining portions of the work-pieces.

In some instances, the joined work-pieces are made of steel or steel alloys. In other instances, the joined work-pieces can be made of other metals, such as for example, aluminum or aluminum alloys. The properties of the material forming the joined work-pieces can be critical factors in determining the amount of electrical welding current required to complete the spot weld. In some instances, such as when the work-pieces are made from aluminum, the aluminum material has a high thermal and electrical conductivity. In these instances, the amount of electrical welding current required to complete the spot weld can be several times the amount of electrical welding current required to complete the spot weld for materials having a lower thermal and electrical conductivity.

The high amounts of electrical welding current can cause distortion of an electrode tip. In addition, brittle deposits can form on portions of the electrode tip. After a period of use, the electrode tips typically are either replaced or returned to an original profile, with any existing deposits removed. The process of restoring the electrode tip to a renewed and useable condition is referred to as "dressing" the electrode. It would be advantageous if the electrode tips could be dressed more easily.

SUMMARY OF THE INVENTION

According to this invention there is provided an electrode dresser. The electrode dresser includes a face cutting segment having a top surface and a face rake surface. The top surface intersects the face rake surface and forms a face cutting edge. The face cutting edge is configured to remove deposits located on a face of an electrode. The face rake surface forms a face rake angle with a line oriented to be generally perpendicular to the top surface. A side cutting segment extends from the face cutting segment and has a top surface and a side cutting surface. The top surface intersects the side cutting surface thereby forming a side cutting edge. The side cutting edge is configured to dress a distorted tapered side of an electrode tip. The side cutting surface forms a side rake angle with a line oriented to be generally perpendicular to the top surface. The face rake angle is different from the side rake angle.

According to this invention, there is also provided a method of electrically checking electrodes for suitability in an apparatus for spot welding subsequent to dressing of the electrodes, the method including the steps of bringing opposing electrodes together such that faces of the electrode tips are in contact with each other, passing an electrical current through the opposing electrodes, measuring the voltage and current passing through the opposing electrodes, calculating the resistance of the opposing electrodes using the measured voltage and current and comparing the calculated resistance of the opposing electrodes with an acceptable range of resistance.

According to this invention, there is also provided a method of mechanically checking electrodes for suitability in an apparatus for spot welding subsequent to dressing of the electrodes, the method including the steps of holding one electrode in a fixed position and moving an opposing electrode such that faces of the electrode tips of the fixed and the moved electrodes are in contact with each other, measuring the total length of the opposed electrodes, measuring the distance that the opposing electrode was moved, calculating the amount of electrode material removed by comparing the total length of the opposing electrodes with the distance the opposing electrode was moved and comparing the calculated amount of electrode material removed with an acceptable range of removed material.

Various objects and advantages will become apparent to those skilled in the art from the following detailed description of the invention, when read in light of the accompanying drawings. It is to be expressly understood, however, that the drawings are for illustrative purposes and are not to be construed as defining the limits of the invention.

DETAILED DESCRIPTION OF THE INVENTION

The present invention will now be described with occasional reference to the specific embodiments of the invention.

This invention may, however, be embodied in different forms and should not be construed as limited to the embodiments set forth herein. Rather, these embodiments are provided so that this disclosure will be thorough and complete and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

In accordance with embodiments of the present invention, a dresser is provided for dressing electrodes used for spot welding work-pieces. In certain instances, the work-pieces are made of aluminum-based materials. However, it is within the contemplation of this invention that the work-pieces can be made of other materials. The term "electrode", as used herein, is defined to mean any electrical conductor used to impart pressure to contacting metallic surfaces and to deliver an electrical welding current through the contacting metallic surfaces. The term "dresser", as used herein, is defined to mean a tool used to machine a tip of an electrode.

Figure 1:
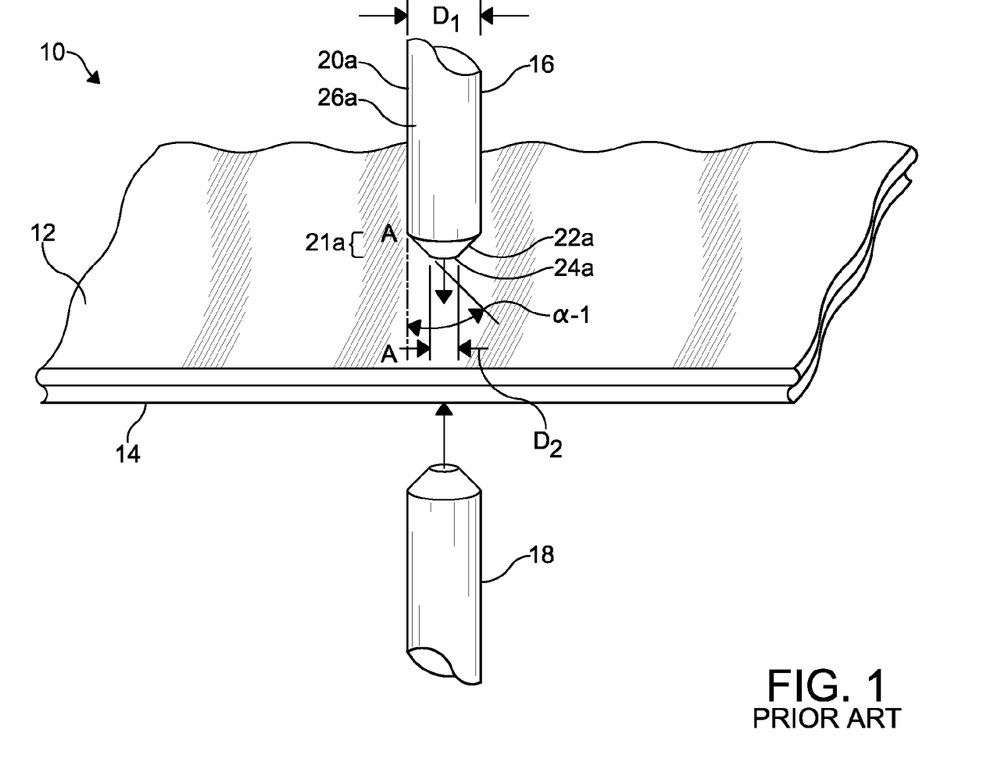
FIG. 1 is a perspective view of a prior art configuration for spot welding, illustrating the work-pieces to be spot welded and opposing electrodes.

Referring now to FIG. 1, one example of a prior art configuration for spot welding aluminum work-pieces is shown generally at 10. The process 10 includes a first work-piece 12, a second work-piece 14 and opposing first and second electrodes 16 and 18. The first and second work-pieces 12 and 14 have the structure of sheets having a thickness in a range of from about 0.5 mm to about 4.0 mm. However, the first and second work-pieces 12 and 14 can have thicknesses less than about 0.5 mm or more than about 4.0 mm. While the first and second work-pieces 12 and 14 have been described as having the structure of thin sheets, the first and second work-pieces 12 and 14 can have other structures, such as bars, channels and the like. Further, while the embodiment illustrated in FIG. 1 shows two work-pieces 12 and 14, it is within the contemplation of this invention that more than two work-pieces can be spot welded together.

Referring again to FIG. 1, the first and second work-pieces 12 and 14 are made of aluminum. Alternatively, the first and second work-pieces 12 and 14 can be made from aluminum alloys, such as for example aluminum 6111, 2008, 5083, 5456 and the like.

Referring again to FIG. 1, the opposing first and second electrodes 16 and 18 are initially positioned apart from the first and second work-pieces 12 and 14. The first electrode 16 has a body 20a and an electrode tip 21a. The electrode tip 21a includes a tapered side 22a extending from the body 20a to a face 24a. The body 20a has a circular cross-sectional shape and has a body diameter D1 in a range of about 12.0 mm to about 25.0 mm. However, the body 20a can have other cross-sectional shapes, such as for example a square cross-sectional shape, and the body diameter D1 can be less than about 12.0 mm or more than about 25.0 mm.

Referring again to FIG. 1, the body 20a of the first electrode 16 can have one or more internal cooling channels (not shown), configured as conduits for cooling fluids used in operation. However, it should be understood that the cooling channels are not necessary to the operation of the electrode dresser.

Referring again to FIG. 1, as discussed above, the tapered side 22a extends from the body 20a to the face 24a. The tapered side 22a forms a truncation angle $\alpha\text{-}1$ with a line A—A extending from a surface 26a of the body 20a. The truncation angle $\alpha\text{-}1$ is approximately 45°. Alternatively, the truncation angle $\alpha\text{-}1$ can be more or less than approximately 45°.

Referring again to FIG. 1, the face 24a of the electrode 16 is oriented such as to be substantially perpendicular to the line A-A. However, the face 24a of the electrode 16 can be oriented such as not be to perpendicular to the line A-A. The face 24a has a circular cross-sectional shape and has a diameter D2 in a range of from about 1.0 mm to about 24.0 mm. Alternatively, the face 24a can have other cross-sectional shapes, such as for example square or rectangular cross-sectional shapes and can have a diameter D2 less than about 1.0 mm or more than about 24.0 mm.

While the first electrode 16 illustrated in FIG. 1 is formed from a copper alloy configured for high electrical welding current flow and high axial pressure, it should be appreciated that the first electrode 16 can be formed from other materials suitable for high electrical welding current flow and high axial pressure.

Referring again to FIG. 1, the second electrode 18 is the same as, or similar to, the first electrode 16 described above and shown in FIG. 1. However, it should be appreciated that the second electrode 18 can be different than the first electrode 16.

Figure 2:
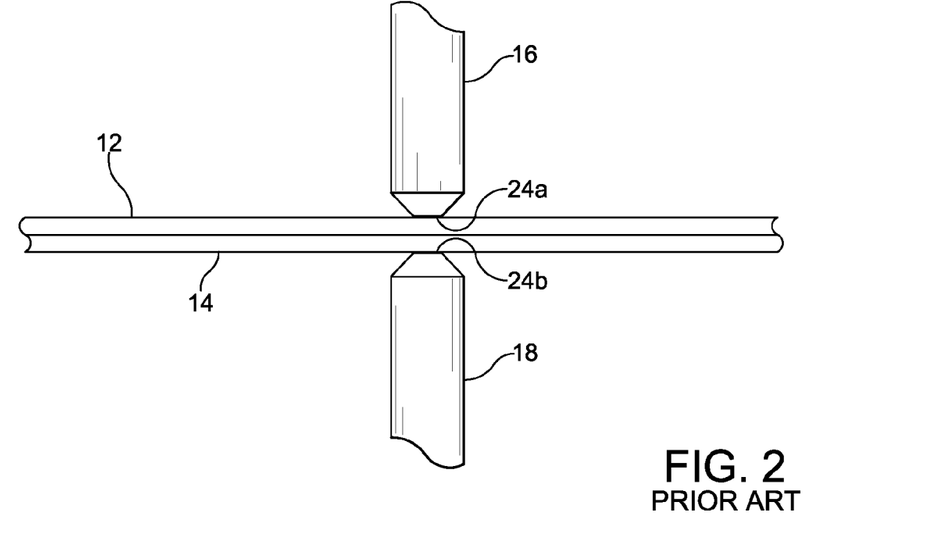
FIG. 2 is a side view, in elevation, of the prior art configuration of FIG. 1 illustrating the opposing electrodes in contact with the work-pieces to be spot welded.

While FIGS. 1 and 2 illustrate one embodiment of an electrode, it should be appreciated that other electrodes, having other shapes and configurations, can be used. One non-limiting example of an alternatively shaped electrode is an electrode having a radiused electrode tip.

Referring now to FIG. 2, in operation the first and second electrodes 16 and 18 are brought together such that the faces 24a and 24b contact the first and second work-pieces 12 and 14, and act to clamp the first and second work-pieces 12 and 14 together. The first and second electrodes 16 and 18 continue to be brought together such as to exert a desired pressure in the area of contact of the faces 24a and 24b. Next, an electrical welding current (not shown) is concentrated into a small area between the faces 24a and 24b. The electrical welding current melts the metal in the small area between the faces 24a and 24b and forms the weld.

Several factors contribute to the amount of electrical welding current used to form the weld, such as for example, the amount of time in which the electrical welding current is applied by the electrodes and the pressure exerted by the electrodes on the materials. Additional factors include the thickness of the work-pieces to be joined, the size and shape of the weld and the thermal and electrical conductivity of the materials to be joined. Certain materials, such as for example, aluminum, have a high thermal and electrical conductivity. In these instances, the amount of electrical welding current required to complete the spot weld can be several times the amount of electrical welding current required to complete the spot weld for materials having a lower thermal and electrical conductivity.

Figure 3A:
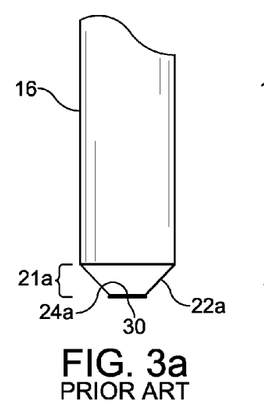
FIG. 3a is a side view, in elevation, of a prior art electrode tip showing deposits on the tip face.

Referring now to FIGS. 3a, 3b, 3c and 3d, the high electrical welding currents, coupled with the high pressure exerted by the electrodes can cause alloy-based deposits to form on the face of the electrode tips, as well as distortion of the electrode tips. Referring first to FIG. 3a, an electrode tip 21a is shown having a deposit of a hard and brittle alloy (hereafter "deposits") 30 formed on the face 24a. The deposits 30 can be a combination of the copper alloy from the electrode and aluminum from the joined work-pieces. However, the deposits can be formed from other materials. It should be noted that the deposits 30 form primarily on the face 24a of the electrode tip 21a and little, if any, of the deposits 30 form on the sides 22a of the electrode tip 21a.

Figure 3B:
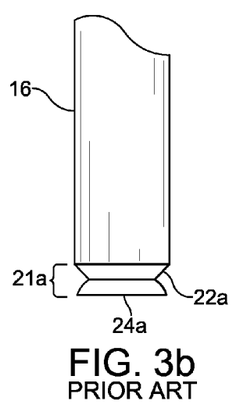
FIG. 3b is a side view, in elevation, of a prior art electrode tip showing a first example of distortion of the face and sides of the electrode tip.

Referring now to FIG. 3b, a first example of distortion of the electrode tip 21a is illustrated. In this example, the electrode tip 21a has "mushroomed". That is, the electrode tip 21a has compressed such that the sides 22a distort and the face 24a is significantly larger than the original face.

Figure 3C:
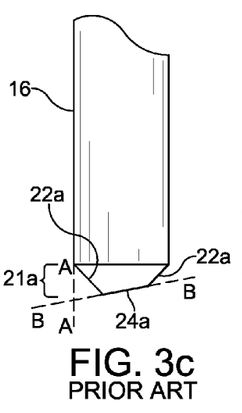
FIG. 3c is a side view, in elevation, of a prior art electrode tip showing a second example of distortion of the face and sides of the electrode tip.

Referring now to FIG. 3c, a second example of distortion of the electrode tip 21a is illustrated. In this example, the electrode tip 21a has eroded in an uneven manner, thereby causing the tapered side 22a to form different lengths. The different lengths of the tapered side 22a cause a line B-B substantially parallel with the face 24a to have a non-perpendicular orientation with a line A-A extending downward from the side of the electrode 16.

Figure 3D:
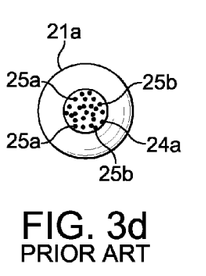
FIG. 3d is a plan view of a prior art electrode tip showing a third example of distortion of the face of the electrode tip.

Referring now to FIG. 3d, a third example of distortion of the electrode tip 21a is illustrated. In this example, the surface of the face 24a of the electrode tip 21a has eroded, become irregular or roughened due to the formation of a plurality of pits 25a, and/or a plurality of projections 25b or other irregularities caused by the alloy deposits.

While FIGS. 3a-3d show deposits on and distortions of the respective electrodes 16, it should be appreciated that some electrodes can have combinations of deposits and various distortions. In order to assure proper welding operation, the electrode tips 21a shown in FIGS. 3a-3d are typically dressed prior to further use. The term "dressed", as used herein, is defined to mean the removal of deposits and the return of the electrode tip to a desired tip profile.

Figure 4:
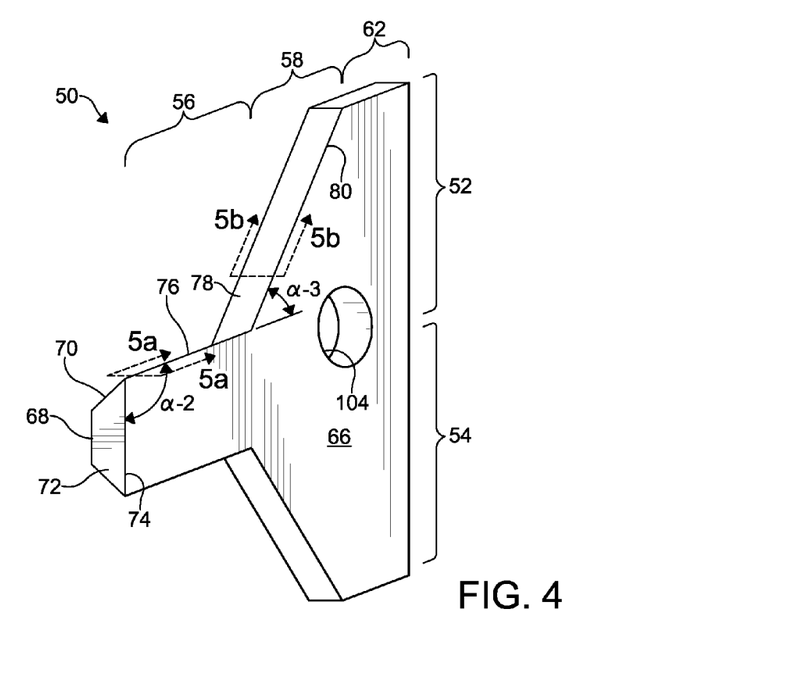
FIG. 4 is a perspective view of a first embodiment of an electrode dresser configured to engage opposing electrodes.
Figure 6:
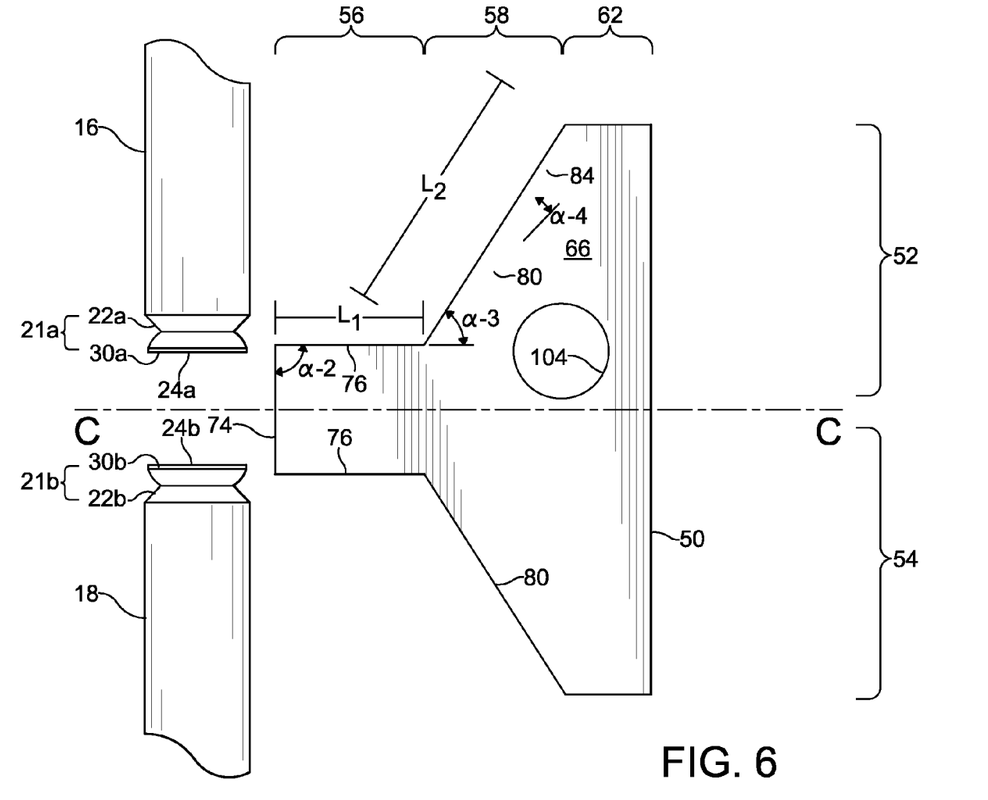
FIG. 6 is a side view, in elevation, of the electrode dresser of FIG. 4 shown in position to engage opposing electrodes.

Referring now to FIGS. 4 and 6, one embodiment of an electrode dresser is shown at 50. Generally, the electrode dresser 50 is configured to simultaneously dress opposing electrode tips 21a and 21b of electrodes 16 and 18 as shown in FIG. 6. Referring again to FIG. 6, the illustrated electrode dresser 50 has an upper half 52 that is a mirror image, with a few exceptions that will be addressed in detail below, of a lower half 54 about a center line C-C. For purposes of simplicity, only the upper half 52 will be described in detail below. However, while the electrode dresser 50 illustrated in FIG. 6 shows use of both upper and lower halves 52 and 54, it is within the contemplation of this invention that the electrode dresser 50 could be configured with just a lower half or just an upper half. Further, it is within the contemplation of this invention that the upper and lower halves 52 and 54 need not have the same or similar structure.

Referring again to FIGS. 4 and 6, the upper half 52 of the electrode dresser 50 has a face cutting segment 56, a side cutting segment 58, a mounting segment 62, a top surface 66 and a bottom surface 68.

The face cutting segment 56 is configured to aggressively engage hard and brittle deposits formed on a face 24a of an electrode tip 21a. The face cutting segment 56 includes a face rake surface 70 and a first end surface 72. The first end surface 72 and the face rake surface 70 each extend from the top surface 66 to the bottom surface 68. The intersection of the top surface 66 and the first end surface 72 forms a first end top edge 74. The intersection of the top surface 66 and the face rake surface 70 forms a face cutting edge 76.

Referring again to FIGS. 4 and 6, the face cutting edge 76 forms a first end angle $\alpha$-2 with the first end top edge 74. In the illustrated embodiment, the first end angle $\alpha$-2 is about 90.0°. Alternatively, the first end angle $\alpha$-2 can be less than about 90.0° or more than about 90.0°.

The face cutting edge 76 has a length L1. In the illustrated embodiment, the length L1 is in a range of from about 0.5 mm to about 12.0 mm. However, in other embodiments, the length L1 can be less than about 0.5 mm or more than about 12.0 mm.

Referring again to FIGS. 4 and 6, the side cutting segment 58 is configured to engage and reform the sides of an electrode tip. The side cutting segment 58 includes a side rake surface 78. The side rake surface 78 extends from the top surface 66 to the bottom surface 68. The intersection of the top surface 66 and the side rake surface 78 forms a side cutting edge 80. Referring now to FIG. 6, the side cutting edge 80 forms a side angle $\alpha$-3 with the face cutting edge 76. In the illustrated embodiment, the side angle $\alpha$-3 is in a range of from about 22.0° to about 60.0°. Alternatively, the side angle $\alpha$-3 can be less than about 22.0° or more than about 60.0°.

Referring again to FIGS. 4 and 6, the side cutting edge 80 has a length L2. In the illustrated embodiment, the length L2 is in a range of from about 4.0 mm to about 15.0 mm. However, in other embodiments, the length L2 can be less than about 4.0 mm or more than about 15.0 mm.

The mounting segment 62 is configured to provide structural support to the face cutting and side cutting segments 56 and 58 when the electrode dresser 50 is mounted in a rotating apparatus (not shown) for use. The mounting segment 62 is conventional in the art and will not be described herein. While the mounting segment 62 is configured as illustrated in FIGS. 4 and 6, it should be appreciated that in other embodiments, the mounting segment 62 can be configured in other manners.

Referring again to FIGS. 4 and 6, optionally the electrode dresser 50 can include an aperture 104. The aperture 104 is configured for use in mounting and supporting the electrode dresser 50 in a rotating apparatus (not shown). The aperture 104 can have any desired shape, size and orientation sufficient to mount and support the electrode dresser 50 in a rotating apparatus. However, it should be appreciated that the electrode dresser 50 can be practiced without the aperture 104. While the embodiment shown in FIG. 6 shows a single aperture 104, it should be appreciated that in other embodiments, the electrode dresser 50 can have more than one aperture.

Figure 5A:
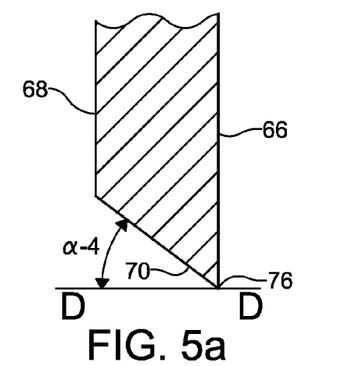
FIG. 5a is a cross-sectional view, taken along the line 5a-5a of FIG. 4, of the face cutting edge and face rake angle of the electrode dresser of FIG. 4.

Referring now to FIG. 5a, a portion of the face cutting segment 56 taken along the line 5a-5a of FIG. 4 is illustrated. The face cutting segment 56 includes the top surface 66, bottom surface 68 and the face rake surface 70. A face rake angle $\alpha$-4 is formed between the face rake surface 70 and a line D-D oriented to be generally perpendicular to the top surface 66. The face rake angle $\alpha$-4 is configured to provide relief between the face cutting edge 76 and the face 24a of the electrode tip 21a. Generally, the amount of the relief between the face cutting edge 76 and the face 24a of the electrode tip 21a helps define the depth of the cut made by the face cutting edge 76. The face rake angle $\alpha$-4 is configured to allow an aggressive cut into a hard and brittle deposit located on the face 24a of the electrode tip 21a. In the illustrated embodiment, the face rake angle $\alpha$-4 is about 5°. However, a face rake angle $\alpha$-4 that is either greater than or less than about 5° is within the scope of this invention, although an inadequate face rake angle α-4 may result in undesirable chattering of the face cutting edge 76 when used to remove the hard and brittle deposits 30 formed on the face 24a of the electrode tip 21a. The term "chattering", as used herein, is defined to mean the skipping of a cutting edge across the surface intended to be cut.

Figure 5B:
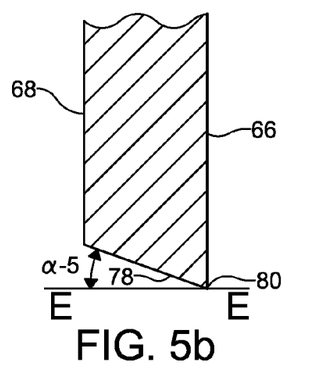
FIG. 5b is a cross-sectional view, taken along the line 5b-5b of FIG. 4, of a side cutting edge and side rake angle of the electrode dresser of FIG. 4.

Referring now to FIG. 5b, a portion of the side cutting segment 58 taken along the line 5b-5b of FIG. 4 is illustrated. The side cutting segment 58 includes the top surface 66, bottom surface 68 and the side rake surface 78. A side rake angle α-5 is formed between the side rake surface 78 and a line E-E oriented to be generally perpendicular to the top surface 66. The side rake angle α-5 is configured to provide relief between the side cutting edge 80 and the tapered side 22a of the electrode tip 21a. The side rake angle α-5 is configured to allow a less aggressive cut into the tapered side 22a of the electrode tip 21a than the cut of the face cutting edge 76 into the deposits 30 on the face 24a of the electrode tip 21a. In the illustrated embodiment, the side rake angle α-5 is about 3°. Alternatively, the side rake angle α-5 can be more or less than about 3° provided the side rake angle α-5 is less than the face rake angle α-4.

Referring now to FIG. 6, use of the electrode dresser 50 will now be described. In a first step, the electrode dresser 50 is mounted in an apparatus (not shown). The apparatus is configured to rotate the electrode dresser 50 about the opposing electrodes 16 and 18. The electrode dresser 50 is mounted such that the mounting segment 62 extends from the apparatus such as to provide structural support to the electrode dresser 50 when in use. It should be understood that any desired type of apparatus, sufficient to securely seat the electrode dresser 50 during rotation, can be used.

Next, the electrodes 16 and 18 are positioned such as to be vertically opposite each other. The electrode dresser 50 begins rotation and engages the opposing electrodes 16 and 18. In operation, the face cutting edges 76 engage the faces 24a and 24b of the electrodes 16 and 18 and the side cutting edges 80 engage the tapered sides 22a and 22b of the electrodes 16 and 18. As discussed above, the face rake angle α-4 is larger than the side rake angle α-5, thereby allowing the face cutting edges 76 to take a more aggressive cut into the hard and brittle alloy deposits 30 on the faces 24a and 24b of the electrode tips 21a and 21b than the cut of the side cutting edges 80 into the tapered sides 22a and 22b of the electrode tips 21a and 21b. Once the alloy deposits 30 have been removed from the electrode tips 21a and 21b, then the tapered sides 22a and 22b can be cut with the side cutting edges 80 using the less aggressive side rake angle α-5.

While the use of the electrode dresser 50 has been described above as sequentially cutting first the hard and brittle alloy deposits 30 on the faces 24a and 24b of the electrode tips 21a and 21b and then cutting the tapered sides 22a and 22b, it should be appreciated that in other embodiments, the electrode dresser 50 can be configured to simultaneously dress the faces 24a and 24b and the tapered sides 22a and 22b of the electrode tips 21a and 21b.

The structure of the electrode dresser 50, having the different rake angles α-4 and α-5 for the face cutting edge 76 and the side cutting edge 80, advantageously provides several benefits over traditional dressers having the same rake angles for the face cutting edge and the side cutting edge. First, the electrode dresser 50 having a more aggressive face rake angle α-4 allows a deeper cut into the deposits 30, thereby substantially reducing the phenomenon of chattering. Reducing the chattering makes the process of dressing the electrode tips 21a and 21b faster and more efficient. Second, the electrode dresser 50 having the less aggressive side rake angle α-5 allows a more controlled removal of the deformed tapered side material once the aggressive cutting of the hard and brittle alloy deposits 30 on the faces 24a and 24b has been completed. A more controlled removal of the deformed side material helps control the side material removal rate, thereby extending the life of the electrodes 16 and 18.

Referring again to embodiment illustrated in FIGS. 4 and 6, the electrode dresser 50 can be formed from materials, such as for example, high speed steel or carbide. In other embodiments, other materials, such as for example, ceramics, cubic born nitride, polycrystalline diamond and the like can be used.

While the embodiment of the electrode dresser 50 illustrated in FIGS. 4 and 6 has been described as a unitary structure, it should be appreciated that in other embodiments, the electrode dresser 50 can be an assembly of discrete components. In one such embodiment, the face cutting edge and the side cutting edge can be formed as inserts and attached to the electrode dresser.

While the embodiment of the upper half 52 of the electrode dresser 50 illustrated in FIGS. 4 and 6 has been described as having a lone face cutting edge 76 and a lone side cutting edge 80, it should be appreciated that in other embodiments, more than one face cutting edge 76 and more than one side cutting edge 80 can be used.

Figure 7:
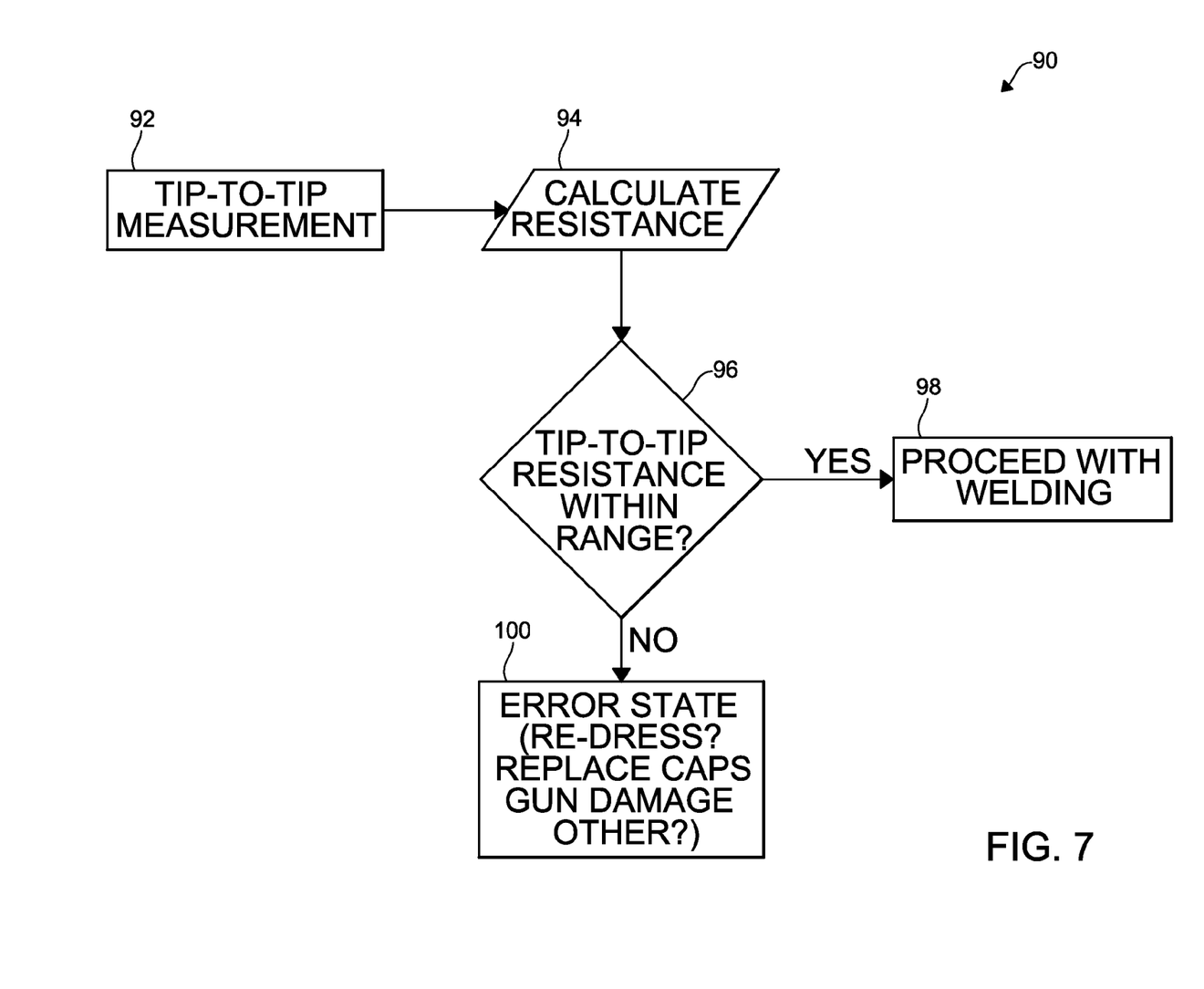
FIG. 7 is a flow chart illustrating the steps of electrically testing dressed electrodes.
Figure 8:
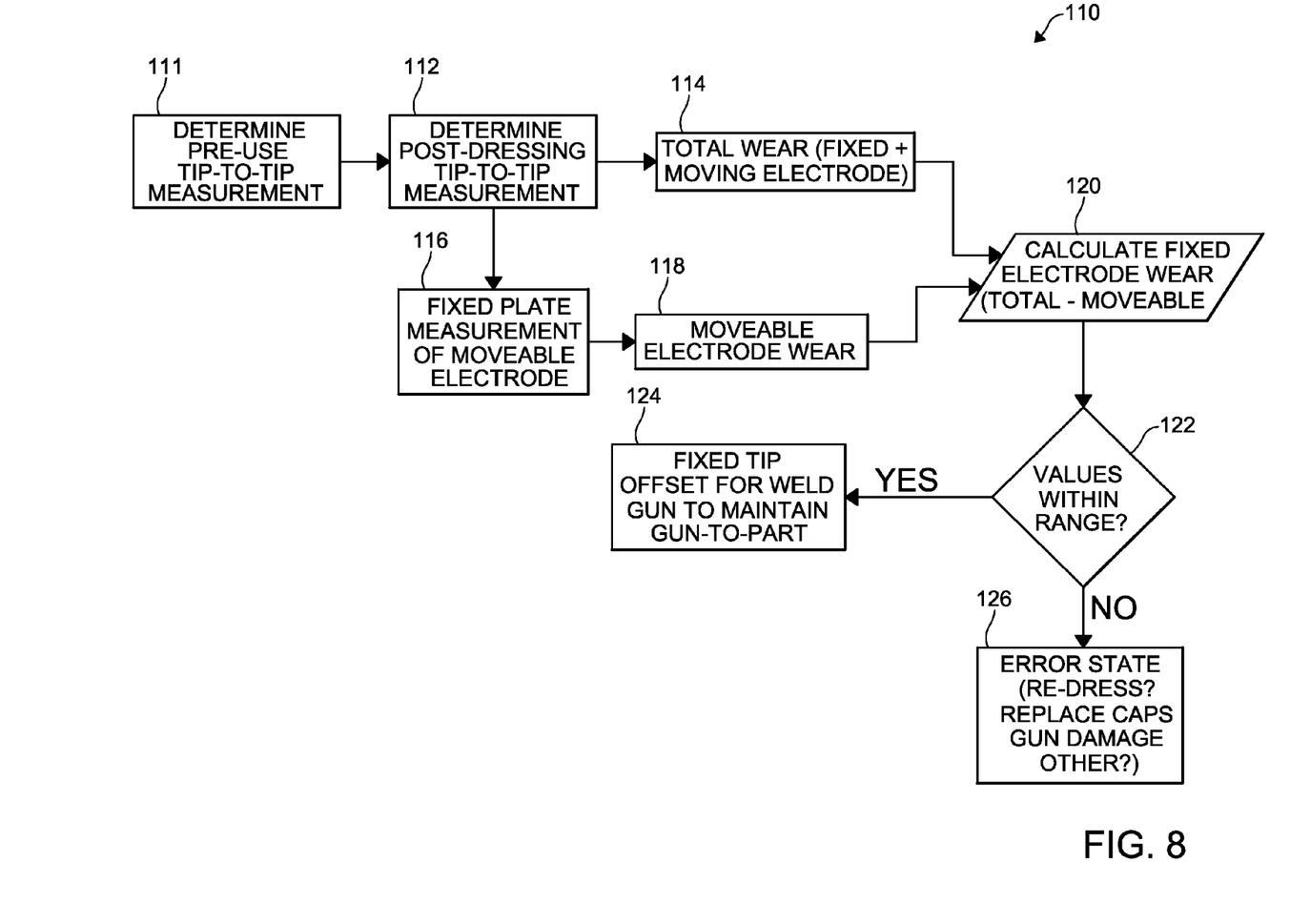
FIG. 8 is a flow chart illustrating the steps of mechanically testing dressed electrodes.

Referring now to FIGS. 7 and 8, following the process of dressing the electrode tips, the electrodes are checked both electrically and mechanically to ensure their post-dressed conditions are suitable for subsequent spot welding operations. Referring first to FIG. 7, a process for checking the electrical suitability of the electrodes is illustrated generally at 90. In a first step 92 of the process 90, the faces of the opposing electrode tips are brought into contact with each other. Then, an electrical current is passed through both electrodes and both voltage and current measurements are taken. In a next step 94, using the measured voltage and current, the electrical resistance of the electrodes is calculated. Referring now to step 96, the calculated electrical resistance is compared against an acceptable resistance range. The acceptable resistance range is determined based on a number of factors, including the non-limiting examples of the electrode material, the shape of the electrode and the size of the electrode. If the calculated electrical resistance is within the acceptable resistance range, then the electrodes are acceptable for use in subsequent spot welding operations as shown by step 98. Conversely, if the calculated electrical resistance is not within the acceptable resistance range, then the electrodes are not acceptable for use in subsequent spot welding operations as shown by step 100. Once it is determined that the calculated resistance is not within the acceptable resistance range, then subsequent evaluations are commenced to determine the nature of the unacceptable resistance. Examples of possible problems with the resistance can include electrode tips that are not adequately dressed and need to be redressed, electrode tips that are beyond a useful life and electrode tips that are installed in a defective electrode apparatus.

Referring now to FIG. 8, once the electrodes have been electrically checked and determined to be electrically acceptable, the electrodes are checked mechanically. Generally, the mechanical check involves determining the amount of electrode material that has been removed by the dressing process and comparing that data with acceptable ranges of removed material. A process for checking the mechanical suitability of the electrodes is illustrated generally at 110. In a first step 111 of the mechanical process 110 and prior to use of the electrodes, one of the opposing electrodes is held in a fixed position and an opposing electrode is moved such that the faces of the opposing electrode tips are brought into contact with each other. The total length of the joined electrodes is measured. In a next step, the opposing electrodes are positioned in the same relative position after the dressing process, such that the total length of the joined electrodes can be measured as shown in steps 112 and 114. In a next step 116, the distance that the opposing electrode was moved is measured. Referring now to steps 118 and step 120, by comparing the total length of the joined electrodes after the dressing process with the total length of the joined electrodes prior to use of the electrodes and with the distance that the opposing electrode was moved, the amount of electrode material removed from each electrode can be determined as shown in step 120.

Referring now to step 122, the amount of electrode material removed from each electrode is compared against an acceptable range. The acceptable range is determined based on a number of factors, including the non-limiting examples of the electrode material, the shape of the electrode and the size of the electrode. If the amount of material removed from each electrode is within the acceptable range, then the electrodes are acceptable for use in subsequent spot welding operations. In this scenario, the apparatus holding the fixed electrode is adjusted for the amount of removed material as shown by step 124. Conversely, if the amount of removed material for each electrode is not within the acceptable range, then the electrodes are not acceptable for use in subsequent spot welding operations as shown by step 126. Similar to the electrical process, once it is determined that the amount of removed material is not within the acceptable range, then subsequent evaluations are commenced to determine the nature of the unacceptable condition.

Figure 9:
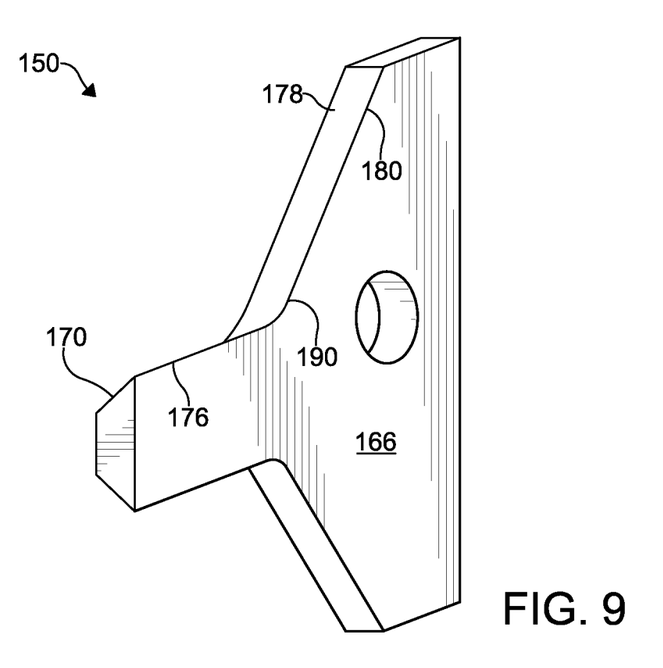
FIG. 9 is a perspective view of a second embodiment of an electrode dresser configured to engage opposing electrodes.
Figure 10:
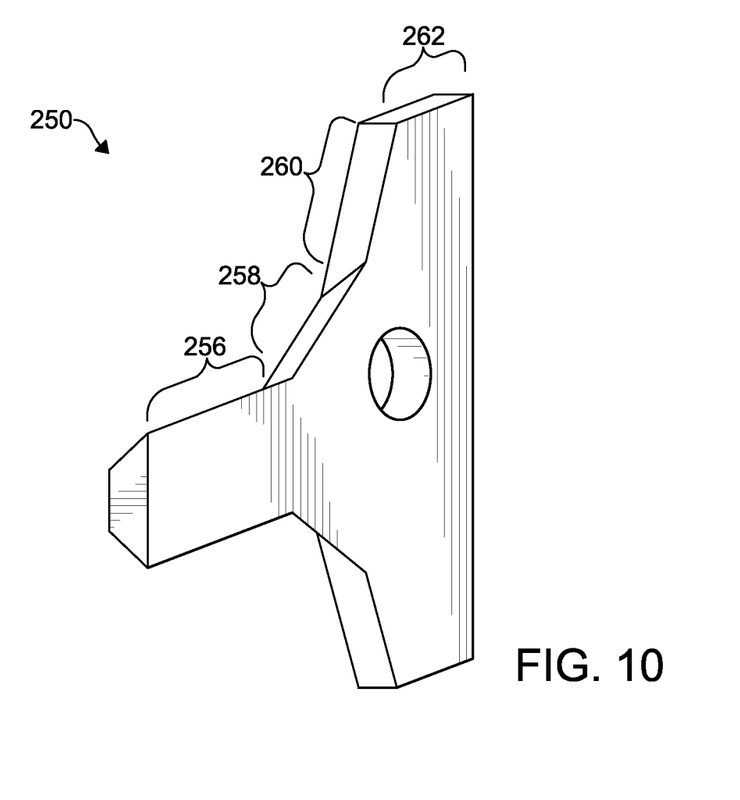
FIG. 10 is a perspective view of a third embodiment of an electrode dresser configured to engage opposing electrodes.

While the electrode dresser 50 illustrated in FIGS. 4 and 6 includes the configurations and structures as described above, it should be appreciated that in other embodiments the electrode dresser 50 can have other configurations and other structures. Referring now to FIGS. 9 and 10, non-limiting examples of electrode dressers having other configurations and other structures are illustrated.

Referring first to FIG. 9, an electrode dresser 150 includes a face cutting edge 176 formed by the intersection of a top surface 166 and a face rake surface 170. Similarly, the electrode dresser 150 includes a side cutting edge 180 formed by the intersection of the top surface 166 and a side rake surface 178. An intersection 190 is formed in an area where the face cutting edge 176 joins with the side cutting edge 180. The intersection 190 has the structure of an arc. The arc-shaped intersection 190 is configured as a cutting edge for electrode tips having a radiused side portions in lieu of a tapered side. In the illustrated embodiment, the arc has a radius in a range of from about 2.0 mm to about 75.0 mm. However, in other embodiments, the arc can have a radius less than about 2.0 mm or more than about 75.0 mm. In the embodiment illustrated in FIG. 9, the face cutting edge 176 and the side cutting edge 180 are shown as sharp edges. However, it is within the contemplation of this invention that optionally the face cutting edge 176 and the side cutting edge 180 can be radiused. The radii forming the face cutting edge 176 and the side cutting edge 180 can be any desired dimension. It is also within the contemplation of this invention that the optional radii forming the face cutting edge 176 and the side cutting edge 180 can be the same dimension, or the radii can be different from each other.

Referring now to FIG. 10, another embodiment of an electrode dresser 250 is illustrated. The electrode dresser 250 includes a face cutting segment 256, a side cutting segment 258 and a mounting segment 262. In the illustrated embodiment, the face cutting segment 256, side cutting segment 258 and mounting segment 262 are the same as, or similar to, the face cutting segment 56, side cutting segment 58 and mounting segment 62 illustrated in FIG. 4 and described above. Alternatively, in other embodiments, the face cutting segment 256, side cutting segment 258 and mounting segment 262 can be different than the face cutting segment 56, side cutting segment 58 and mounting segment 62.

Referring again to FIG. 10, the electrode dresser 250 also includes an intermediate segment 260 that extends from the side cutting segment 258 to the mounting segment 262. The intermediate segment 260 is configured to provide clearance space for the face cutting and side cutting segments 256 and 258 as the electrode dresser 250 engages tips of an electrode (not shown). The intermediate segment 260 can have any desired length and can form any desired angle with the side cutting segment 258 sufficient to provide clearance space for the face cutting and side cutting segments 256 and 258.

The principles and mode of operation of the electrode dresser have been described in its preferred embodiments. However, it should be noted that the electrode dresser may be practiced otherwise than as specifically illustrated and described without departing from its scope.

What is claimed is:

1. An electrode dresser comprising:
   a face cutting segment having a top surface and a face rake surface, the top surface intersecting the face rake surface thereby forming a face cutting edge, the face cutting edge configured to remove deposits located on a face of an electrode, the face rake surface forming a face rake angle with a line oriented to be generally perpendicular to the top surface; and
   a side cutting segment extending from the face cutting segment and having a top surface and side cutting surface, the top surface intersecting the side cutting surface thereby forming a side cutting edge, the side cutting edge configured to dress a distorted tapered side of an electrode tip, the side cutting surface forming a side rake angle with a line oriented to be generally perpendicular to the top surface;
   wherein the face rake angle is different from the side rake angle.

2. The electrode dresser of claim 1, wherein the face rake angle is larger than the side rake angle.

3. The electrode dresser of claim 1, wherein the electrode is configured for use in spot welding aluminum components together.

4. The electrode dresser of claim 1, wherein the face rake angle is about 5°.

5. The electrode dresser of claim 1, wherein the side rake angle is about 3°.

6. The electrode dresser of claim 1, wherein the face cutting edge is configured to cut deposits formed from a copper and aluminum alloy.

7. The electrode dresser of claim 1, wherein the side cutting edge extends from the face cutting edge at an angle, and wherein the angle is in a range of from about 22.0° to about 60°.

8. The electrode dresser of claim 1, wherein the electrode dresser is formed as a unitary structure.

9. The electrode dresser of claim 1, wherein more than one face cutting edge is configured to remove deposits located on a face of an electrode, and wherein each face cutting edge has a face rake angle.

10. The electrode dresser of claim 1, wherein more than one side cutting edge is configured to dress a distorted tapered side of an electrode tip, and wherein each side cutting edge has a side rake angle.

11. The electrode dresser of claim 1, wherein the face cutting edge has an opposing face cutting edge configured to remove deposits located on a face of an opposing electrode.

12. The electrode dresser of claim 11, wherein the side cutting edge has an opposing side cutting edge configured to dress distorted sides of an opposing electrode.

13. The electrode dresser of claim 12, wherein the opposing face cutting edge has a rake angle that is larger than a rake angle of the opposing side cutting edge.

14. The electrode dresser of claim 12, wherein the side cutting edge and the opposing side cutting edge have the same side rake angle.

15. The electrode dresser of claim 14, wherein the opposing side rake angle is about 3°.

16. The electrode dresser of claim 11, wherein the face cutting edge and the opposing face cutting edge have the same face rake angle.

17. The electrode dresser of claim 16, wherein the opposing face rake angle is about 5°.

18. The electrode dresser of claim 11, wherein the side cutting edges extend from the face cutting edges at angles in a range of from about 22° to about 60°.

\* \* \* \* \*